March 14, 1967 G. MOURIER 3,309,660

ELECTRON DISCHARGE AMPLIFIER DEVICE

Filed May 22, 1962 3 Sheets-Sheet 1

INVENTOR:
Georges MOURIER

BY Paul M. Craig, Jr.
ATTORNEY

INVENTOR:
Georges MOURIER
BY Paul M. Craig, Jr.
ATTORNEY

ELECTRON DISCHARGE AMPLIFIER DEVICE

INVENTOR:
Georges MOURIER
BY Paul M. Craig, Jr.
ATTORNEY 3,309,660

ELECTRON DISCHARGE AMPLIFIER DEVICE

Georges Mourier, 79 Blvd. Haussmann, Paris, France

Filed May 22, 1962, Ser. No. 196,704
Claims priority, application France, May 26, 1961, 862,948
12 Claims. (Cl. 330—47)

The present invention relates to magnetron amplifiers and aims at obtaining from such an amplifier a very much larger power than that realized in the amplifiers known to date.

The known magnetron amplifiers of the prior art comprise generally a delay circuit having two distinct extremities to which are coupled, respectively, the input and the output of the ultra high frequency wave. The wave within the delay circuit enters into interaction with the electrons provided either by a gun in the form of a beam or by a cathode extending along the delay circuit. In the former case, the beam is absorbed by the circuit at the end of a certain length thereof so that a further increase in this length is no longer susceptible to increase the gain; the output power remains therefore limited by the saturation. In the latter case, it is possible to realize a very high gain by increasing the length of the circuit which in turn increases at the same time the power but limitations are rapidly imposed by the danger of auto-oscillation of an amplifier having a very high gain; the power supplied is therefore also limited in these prior art devices.

One might also give some thought to increase the power of these amplifiers, as also of other known amplifiers, by causing the same to operate at very high voltage. However, such a voltage entrains technological difficulties in the realization of the amplifier, necessitates a rather costly and bulky supply device or voltage source, and poses the problem of capacity of dissipation of the collector.

One might also consider the possibility of placing in parallel unitary amplifiers of which the power limit has been attained. However, such a parallel connection poses the problem of phase alignment of the output power since the phase shift within the tube may vary from one tube to the other, and also the problem of cophasal excitation of all the tubes over a large band.

Amplifiers are also known in the prior art of which the power has been increased by the use of bi-dimensional delay circuits. In that case, however, one is confronted with the problem of separation of the modes and of stability of operation of the amplifier at a given frequency.

The present invention eliminates all of these difficulties and permits realization of a very high power amplifier, operating at a relatively low voltage, and in which the problem of separation of modes is resolved in a satisfactory manner.

The amplifier in accordance with the present invention is composed substantially of the combination of the following elements:

A non-re-entrant uniformly iterative delay circuit, having two distinct extremities or ends mutually uncoupled, and preferably linear;

A cathode extending along the delay circuit;

A source of transverse magnetic field established within the interaction space defined by the cathode and the delay circuit;

An input of ultra-high frequency energy coupled to one end of the circuit;

Eventually, but not necessarily, an energy output coupled to the second end of the circuit, this output, in the case in which it exists, playing the role of only a secondary output intended to remove a small fraction of the total power supplied by the amplifier; and A principal energy output, distributed along the circuit and coupled therewith at a series of points in which there is established within the circuit an ultra-high frequency field substantially of the same phase when the amplifier operates in a mode suitably chosen, for example, substantially in the $\pi$ mode; in this case, the delay circuit will be of the type of a chain of periodic cells of which each is composed of two non-identical elements, for example, of the "rising sun" type.

The combination of a delay circuit, such as a "rising sun" delay circuit with an elongated cathode, a transverse magnetic field, an output coupled to a series of points along the circuit from which energy is removed or abstracted in phase, is already known in magnetron oscillators. However, the circuit is in that case re-entrant, that is, closed upon itself in the form of a circle. This structure is therefore different from the combination claimed herein, and furnishes neither gain which does not exist in the oscillators nor very high power because of the impossibility to extend indefinitely the length of the delay circuit which is limited by the transverse bulkiness of the circular structure and the increasing number of modes of oscillation that would otherwise occur.

Accordingly, it is an object of the present invention to provide an electron discharge amplifier device of the type described hereinabove which is capable of producing very high power outputs without entailing the difficulties and shortcomings encountered in the prior art devices.

Another object of the present invention resides in the provision of a magnetron amplifier of which the output power is vastly superior to that attainable heretofore in analogous devices without, however, involving the drawbacks of high voltage and large dimensions required in the prior art devices.

Still a further object of the present invention resides in the provision of a high-power amplifier device of the type described hereinabove in which the danger of auto-oscillation is effectively minimized notwithstanding the high power outputs obtainable with the amplifier and without the problem of separation of modes and therewith difficulties in the stability of the operation of the amplifier at a given frequency.

Another object of the present invention resides in the provision of a wide-band high-power amplifier of the type described hereinabove which does not require expensive high voltage supply sources, does not involve special considerations concerning the capacity of dissipation of high power at the collector, and permits the use of several devices connected in parallel without the difficulties normally encountered in cophasal excitation and power output removal as is known in the prior art.

These and other objects, features and advantages of the present invention will become more obvious from the following description when taken in connection with the accompanying drawing which shows, for purposes of illustration only, two embodiments in accordance with the present invention, and wherein FIGURE 1 is a longitudinal cross sectional view of one embodiment of an electron discharge device in accordance with the present invention;

Figure 1:
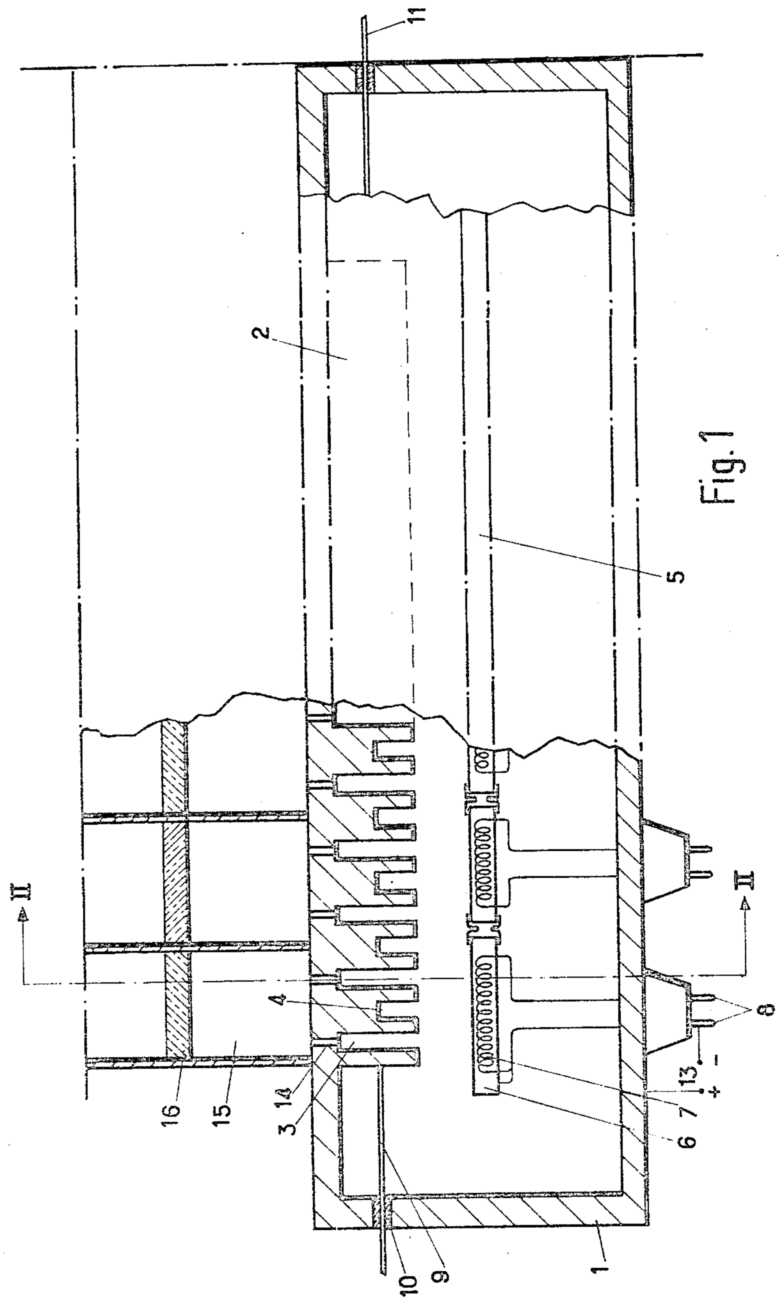
Figures 2, 3:
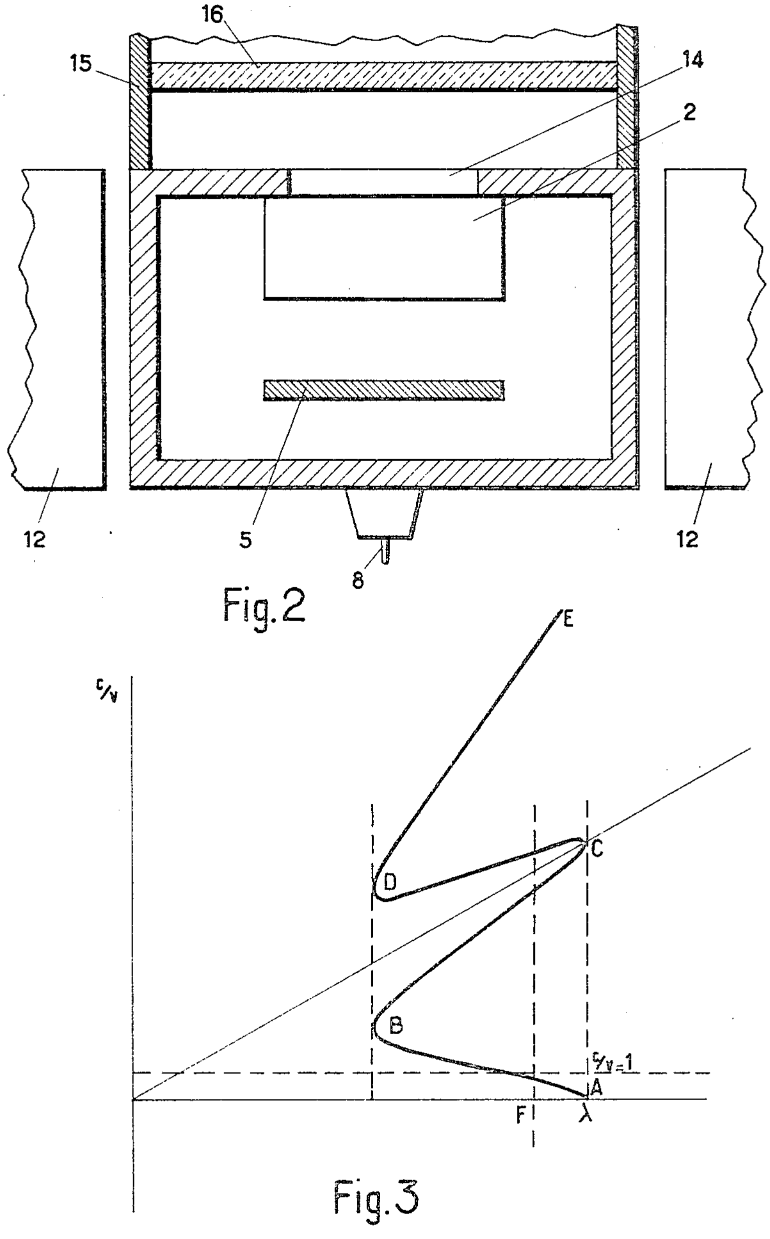
FIGURE 2 is a transverse cross sectional view, taken along line II—II of FIGURE 1.
FIGURE 3 is a diagram explaining the present invention.

Referring now to the drawing wherein like reference numerals are used throughout the various views to designate like parts, and more particularly to FIGURES 1 and 2 which illustrate in FIGURE 1 the tube in longitudinal cross section and in FIGURE 2 the tube in transverse cross section, taken along line II—II of FIGURE 1, the tube illustrated therein comprises a metallic parallelepipedic casing forming a vacuum-tight enclosure. To the upper wall of the casing 1 is secured a uniformly iterative delay circuit 2, of linear form, and of the general type of a chain of periodic cells of which each is composed of a pair of non-identical elements, particularly in the example represented herein a circuit of the "rising sun" type composed alternately of longer slots 3 and shorter slots 4, composed, for example, for the convenience in construction, of contiguous portions 6 heated by separate filaments 7 supplied by connections 8 extends along the delay circuit 2. One end of the delay circuit 2 is coupled to the input of ultra-high frequency energy 9, traversing the walls of the casing 1 across an insulating passage 10. On the opposite side is coupled to the outer end of the delay circuit an ultra-high frequency output 11 which plays only the roll of a secondary output and may be suppressed under certain conditions. The length of the circuit may be, in principle, as long as one desires.

The tube is placed within a transverse magnetic field supplied by the pole pieces 12 shown in FIGURE 2. A high voltage supply is applied between the terminals 13 to create between the delay circuit 2 and the cathode 5 a transverse electric field perpendicular to the magnetic field. The direction of the latter is such that the electrons move in the direction from the input 9 to the output 11.

The principal output of the amplifier is distributed along the circuit 2. For that purpose, coupling windows 14 with the homologous slots, for example, with slots 3, are provided within the casing 1, and the energy leaving through these windows is guided, for example, by a series of adjacent guides 15, secured to the casing 1, the vacuum-tight enclosure being closed by the insulating windows 16. The guides 15, without delay characteristics or delay properties, transmit the abstracted energy toward one or several desired destinations, within common or separate utilization circuits (not shown), for example, in a common horn (not shown) which permits a radiation of the total energy supplied by the tube.

The dimensions of the circuit, relative to the utilized frequency, is such that the energy propagates along the circuit in the $\pi$ mode or in the vicinity thereof.

To understand more readily the operaton of the present invention and the advantages of the amplifier described, it is useful to recall some of the properties of the circuits in the form of a chain of periodic cells composed each of a pair of non-identical elements, of which the "rising sun" type circuit is one example.

These properties are shown by the dispersion curve typical for such a circuit, a curve shown in FIGURE 3 and expressing the ratio $c/v$ as a function of the wave length $\lambda$, $c$=the speed of light $v$=phase velocity of the wave.

This curve is composed of the branch AB representing the fundamental space harmonic, and the branches BC, CD, DE, etc., representing the successive space harmonics.

The particularity of the type of circuit defined hereinabove is that, the point C of the branch BC of the first space harmonic representing the $\pi$ mode and corresponding to a certain wave length $\lambda$, one finds on the same wave length the extremity A of the fundamental branch AB, this point corresponding to $c/v=0$, that is to the infinite phase velocity.

Since the branch AB is located at least in a portion thereof below the straight line $c/v=1$, one finds also, for the points of the branch BC in the neighborhood of the $\pi$ mode points of the same abscissa on the branch AB for which the phase velocity is greater than $c$.

The physical interpretation of this particularity of the dispersion curves is that, if the propagaion of a space harmonic takes place within a circuit of the type described according to the $\pi$ mode, this propagation is accompanied by the creation of a longitudinal component of the fundamental field, having an infinite phase velocity, that is, a zero phase constant $$\left(\text{the phase constant}=\frac{2\pi}{\lambda}\cdot\frac{c}{v}\right)$$

One finds therefore this field, at the same instant, and at all homologous points of the circuit, with the same phase; this field is particularly established in the stationary form within the slots of the circuit; this fact explains that it is possible, by coupling to homologous points such as are constituted by the slots 3, to abstract in-phase energy, if all of the windows 14 have the same geometrical dimensions and do not introduce any relative phase displacement. Thus, it can be appreciated that the delay circuit is uniformly iterative or substantially uniformly iterative. This energy propagates in the form of a rapid wave, that is, having a phase velocity superior to $c$, the more close to infinity as the tube operates more closely to the $\pi$ mode; consequently, this energy may be therefore, efficiently guided by wave guides devoid of any retarding properties such as guides 15.

This property is still approximately valid if one operates within the limits of a certain band in the vicinity of the $\pi$ mode, for example, within the band AF of FIGURE 3.

On the basis of the explanations given hereinabove, it is easy to understand the operation of the amplifier in accordance with the present invention which is as follows:

After the necessary electric and magnetic fields are established, and the input 9 is supplied by the appropriate frequency to be amplified, the wave which propagates along the circuit 2 in the $\pi$ mode is amplified by the interaction with the electrons emitted by the cathode 5, moving from the input to the output within the crossed magnetic and electric fields, according to the known mechanism of travelling wave magnetrons. However, to the difference from the known magnetron amplifiers, the totality of the power produced is not conducted to the output at the end of the delay circuit but the largest portion of the power thus produced flows through the output uniformly distributed along the delay circuit where it is abstracted as already described hereinabove, substantially in phase at all points. There exists only a relatively small power, of the order of the input power, which reaches the output 11, and this power may be either utilized or absorbed in an external load. The output 11 may also be suppressed, and the power reaching the end of the circuit 2 will then be either absorbed by an attenuation disposed on the inside of the tube or left free to be reflected, it being presumed that the to and fro circulation of this reflected wave would be insufficient to initiate the oscillation of the tube, taking into consideration the strong damping created by the large output load distributed uniformly along the delay circuit. The output power is utilized, by the intermediary of the guide 15 to excite a radiation system or any other appropriate load device.

The advantages of the present invention consist primarily in the effective separation of modes thanks to the heavy load uniformly distributed along the circuit, in the satisfactory resolution of the problem of effectively placing the output power in phase, in the realization which permits obtainment of high power with a relatively low voltage, and in the possibility to increase in principle indefinitely the length of the circuit which leads to a quasi-infinite increase in the output power without the intervention of saturation. Since the tube operates with a constant energy density along the entire length thereof, the technological realization thereof is relatively easy, and the eventual secondary output need not be of large dimensions. It may therefore be readily seen from what has been said hereinabove that the amplifier according to the present invention avoids effectively the inconveniences and shortcomings of the known devices.

Figure 4:
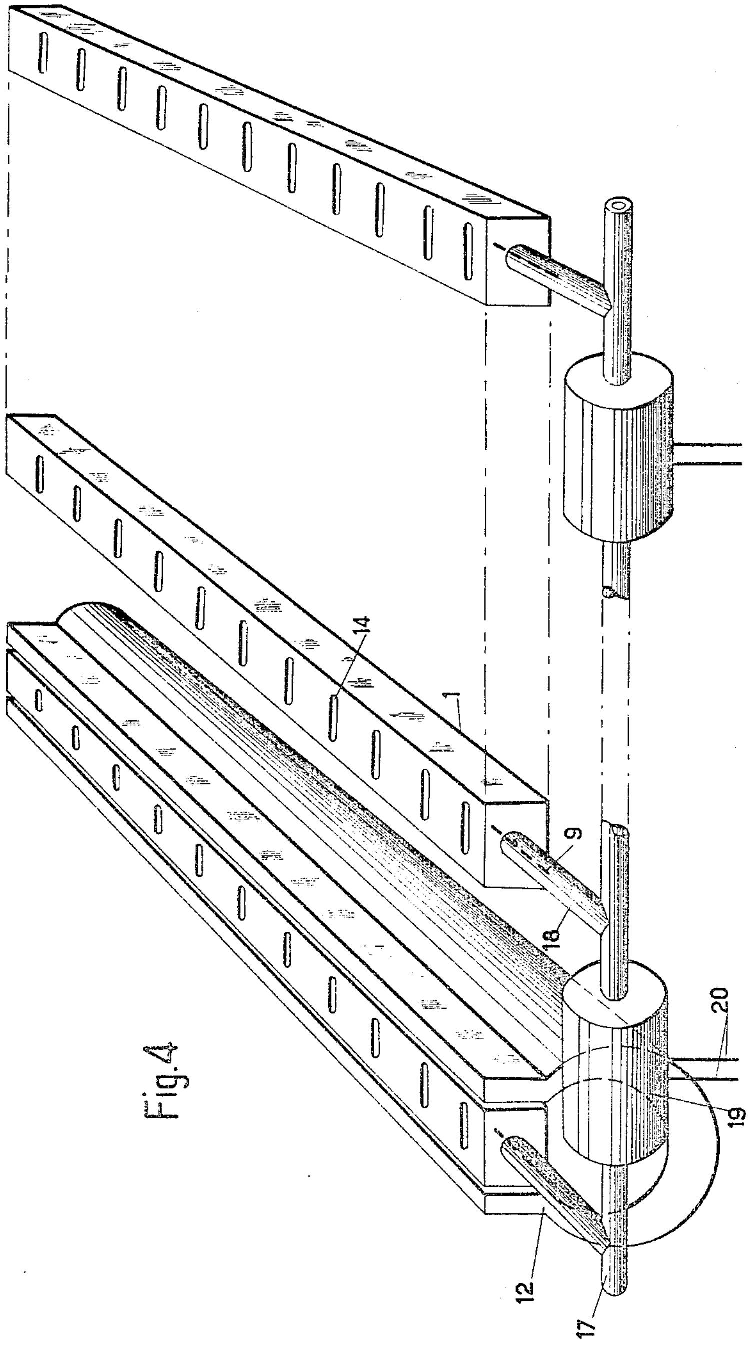
FIGURE 4 is a partial perspective view of an alignment of several tubes according to FIGURES 1 and 2.

FIGURE 4 illustrates in perspective an alignment of tubes such as shown in FIGURES 1 and 2, similar reference numerals being again used in this figure to designate analogous elements. For sake of clarity of the drawing, the wave guides 15 have been omitted and the magnet 12 has been illustrated only in association with the first tube located to the left of this view. The energy is supplied through a common coaxial cable 17 provided with branches 18 coupled to the input 9 of successive tubes 1. Ferrite devices 19 are interposed within the coaxial cable 17 between each pair of successive branches 18, these ferrite devices 19 being controlled by the electric current supplied through the connections 20. In that manner, it is possible to control the phase of excitation of the tubes 1 individually by the energy supplied through the coaxial cable 17. The phase velocity in the direction of the elementary tubes may be controlled within the domain about the point of operation by modifying the frequency of the input signal or the operating voltage of the tubes. The alignment of the tubes 1 then behaves in effect as a bi-dimensional antenna in which the radiation leaving through the slots 14 is concentrated in a beam of which the orientation may be controlled electronically in all directions of space.

While I have shown and described two embodiments in accordance with the present invention, it is understood that the same is not limited thereto, but is susceptible of many changes and modifications within the spirit and scope of a person skilled in the art. For example, any other delay circuit equivalent within the limits of the general definition indicated hereinabove may be utilized in the place of the "rising sun" circuit. Even though the linear form of the tube, as illustrated, offers the advantage of being able to increase the longitudinal extension of the tube without increasing the transverse bulkiness thereof, the circular form may also be utilized up to the limit of tolerance of the transverse bulkiness. Furthermore, the construction of the couplings with the delay circuit at the input and output side thereof, and the arrangement of circuits for the removal of the supplied energy by the tube are susceptible of numerous modifications as known to a person skilled in the art and do not vary the essence and spirit of the present invention.

Consequently, it is obvious that the present invention is susceptible of many changes and modifications within the scope thereof, and I therefore do not wish to be limited to the details shown and described herein, but intend to cover all such changes and modifications as are encompassed by the scope of the appended claims.

I claim:

1. A magnetron amplifier comprising a non-re-entrant uniformly iterative delay circuit means having a plurality of uniform periodic cells and having effectively an input end and an output end mutually decoupled, cathode means extending along said delay circuit means and spaced therefrom a uniform distance to define a uniform interaction space therewith, means for establishing an electrostatic field within said interaction space between said delay circuit means and said cathode means, means for establishing within said interaction space a transverse magnetic field crossed with said electrostatic field, said delay circuit means being of a type providing a series of periodically spaced homologous points in which the electromagnetic field having substantially the same phase at substantially the same instant appears at said points and in which microwave propagates on a given wave length simultaneously in the substantially infinite-phase velocity mode and at least in the neighborhood of a predetermined retarded mode, input means coupled to said input end for injecting microwave energy into said circuit, and a plurality of output means separate and distinct from said input means distributed along said delay circuit means and coupled to respective ones of said periodic cells for abstracting therefrom amplified energy.

2. A magnetron amplifier comprising a non-re-entrant uniformly iterative delay circuit means of linear shape having a plurality of uniform periodic cells and having effectively an input end and an output end mutually decoupled, cathode means extending along said delay circuit means and spaced therefrom a uniform distance to define uniform interaction space therewith, means for establishing an electrostatic field within said interaction space between said delay circuit means and said cathode means, means for establishing within said interaction space a transverse magnetic field crossed with said electrostatic field, said delay circuit means being of a type including a chain of uniform periodic cells each formed by two non-identical delay elements and effectively providing thereby a circuit in which microwave propagates on a given wave length simultaneously in the substantially infinite-phase velocity mode and at least in the neighborhood of a predetermined retarded mode, input means coupled to said input end for injecting microwave energy into said circuit, and a plurality output means separate and distinct from said input means distributed along said delay circuit means and coupled to respective ones of said periodic cells for abstracting therefrom amplified energy.

3. A magnetron amplifier comprising a non-re-entrant uniformly iterative delay circuit means having a plurality of uniform periodic cells and having effectively an input end and an output end mutually decoupled, cathode means extending along said delay circuit means and spaced therefrom a uniform distance to define a uniform interaction space therewith, means for establishing an electrostatic field within said interaction space between said delay circuit means and said cathode means, means for establishing within said interaction space a transverse magnetic field crossed with said electrostatic field, said circuit being of a type including a chain of periodical cells each formed by two non-identical delay elements and effectively providing thereby a circuit in which microwave propagates on a given wave length simultaneously in the substantially infinite-phase velocity mode and a at least in the neighborhod of the $\pi$ mode, input means coupled to said input end for injecting microwave energy into said circuit, and a plurality of output means separate and distinct from said input means distributed along said delay circuit means and coupled to respective ones of said periodic cells for abstracting therefrom amplified energy, and secondary output means coupled to said output end.

4. A magnetron amplifier comprising a non-re-entrant uniformly iterative delay circuit means of the rising-sun type having a plurality of uniform periodic cells and having effectively an input end and an output end mutually decoupled, cathode means extending along said delay circuit means and spaced therefrom a uniform distance to define a uniform interaction space therewith, means for establishing an electrostatic field within said interaction space between said delay circuit means and said cathode means, means for establishing within said interaction space a transverse magnetic field crossed with said electrostatic field, said delay circuit means being of the rising-sun type including a chain of uniform periodic cells each formed by two non-identical delay elements having alternatively relatively long and relatively short slots and effectively providing thereby a circuit in which microwave propagates on a given wave length simultaneously in the substantially infinite-phase velocity mode and at least in the neighborhood of a predetermined retarded mode, input means coupled to said input end for injecting microwave energy into said circuit, and a plurality of output means separate and distinct from said input means distributed along said delay circuit means and coupled to respective ones of said periodic cells for abstracting therefrom amplified energy.

5. A magnetron amplifier comprising a non-re-entrant uniformly iterative delay circuit means having a plurality of uniform periodic cells and having effectively an input end and an output end mutually decoupled, cathode means extending along said delay circuit means and spaced therefrom a uniform distance to define a uniform interaction space therewith, means for establishing an electrostatic field within said interaction space between said delay circuit means and said cathode means, means for establishing within said interaction space a transverse magnetic field crossed with said electrostatic field, said delay circuit means being of a type in which microwave propagates on a given wave length simultaneously in the substantially infinite-phase velocity mode and at least in the neighborhood of a predetermined retarded mode, input means coupled to said input end for injecting microwave energy into said circuit, and output means separate and distinct from said input means constituted by a plurality of substantially delayless structures distributed along said delay circuit means and coupled to respective ones of said periodic cells for abstracting therefrom amplified energy.

6. A magnetron amplifier comprising a non-re-entrant uniformly iterative delay circuit means having effectively an input end and an output end mutually decoupled, cathode means extending along said delay circuit means and spaced therefrom a uniform distance to define a uniform interaction space therewith, means for establishing an electrostatic field within said interaction space between said delay circuit means and said cathode means, means for establishing within said interaction space a transverse magnetic field crossed with said electrostatic field, said delay circuit means being of the rising-sun type having a series of uniform periodic cells each formed by two non-identical delay elements comprised by relatively long slots and a series of relatively short slots alternating with said long slots and effectively providing a circuit in which microwave propagates on a given wave length simultaneously in the substantially infinite-phase velocity mode and at least in the neighborhood of a predetermined retarded mode, input means coupled to said input end for injecting microwave energy into said circuit, and a plurality of output means separated and distinct from said input means and comprised by substantially delayless structures distributed along said delay circuit means and coupled to respective ones of said periodic cells by coupling slots provided in the bottom of each slot of one of said series for abstracting therefrom amplified energy.

7. A magnetron amplifier comprising a plurality of amplifiers arranged side by side, each amplifier comprising a non-re-entrant uniformly iterative delay circuit means having a plurality of uniform periodic cells and having effectively an input end and an output end mutually decoupled, cathode means extending along said delay circuit means and spaced therefrom a uniform distance to define a uniform interaction space therewith, means for establishing an electrostatic field within said interaction space between said circuit and said cathode means, means for establishing within said interaction space a transverse magnetic field crossed with said electrostatic field, said circuit being of a type in which microwave propagates on a given wave length simultaneously in the substantially infinite-phase velocity mode and at least in the neighborhood of a predetermined retarded mode, a plurality of output means separate and distinct from said input means distributed along said circuit and coupled to respective ones of said cells for abstracting therefrom amplified energy, and common input means including a common input branch coupled to the respective input ends of the delay circuits, and means for injecting microwave energy into said common input branch.

8. A magnetron amplifier comprising a plurality of amplifiers arranged side by side, each amplifier comprising a non-re-entrant delay circuit having effectively an input end and an output end mutually decoupled, cathode means extending along said circuit and spaced therefrom a uniform distance to define a uniform interaction space therewith, means for establishing an electrostatic field within said interaction space between said circuit and said cathode means, means for establishing within said interaction space a transverse magnetic field crossed with said electrostatic field, said circuit being of a type including a series of periodically spaced points and in which microwave propagates on a given wave length simultaneously in the substantially infinite-phase velocity mode and at least in the neighborhood of a predetermined retarded mode, output means distributed along said circuit and coupled to said points for abstracting therefrom amplified energy, and common input means including a common input branch coupled to the respective input ends of the delay circuits, and means for injecting microwave energy into said branch including phase-control means in said branch between successive amplifiers.

9. A magnetron amplifier comprising a plurality of amplifiers arranged side by side, each amplifier comprising a non-re-entrant delay circuit having effectively an input end and an output end mutually decoupled, cathode means extending along said circuit and spaced therefrom a uniform distance to define a uniform interaction space therewith, means for establishing an electrostatic field within said interaction space between said circuit and said cathode means, means for establishing within said interaction space a transverse magnetic field crossed with said electrostatic field, said circuit being of a type including a series of periodically spaced points and in which microwave propagates on a given wave length simultaneously in the substantially infinite-phase velocity mode and at least in the neighborhood of a predetermined retarded mode, output means distributed along said circuit and coupled to said points for abstracting therefrom amplified energy, and common input means including a common input branch coupled to the respective input ends of the delay circuits, and means for injecting microwave energy into said branch including phase-control means in said branch between successive amplifiers, said phase-control means including ferrite devices provided with electrically actuated means for varying the phase-shift properties thereof.

10. In a magnetron-type high-power amplifier device having cathode means for emitting electrons, wave guiding means having effectively two mutually substantially uncoupled ends uniformly spaced from said cathode means and defining a uniform interaction space therewith, input means connected to said wave guiding means near one end thereof, means for producing a flow of electrons emitted by said cathode means along said wave guiding means in the direction from said one end to the other end thereof including means for producing within said interaction space crossed electric and magnetic fields, the improvement essentially consisting of non-reentrant uniformly iterative delay circuit means coupled to and comprising a part of said wave guiding means for effectively abstracting the in-phase amplified energy at a plurality of spaced output points along said wave guiding means, said output points being separate and distinct from the input means to said wave guiding means, said delay circuit means having a plurality of uniform periodic cells and being of the type effectively providing a wave propagation on a given wave length simultaneously in the substantially infinite-phase velocity mode and at least near the pi-mode, and said cathode means and said delay circuit means being substantially coextensive and rectilinear.

11. In a magnetron-type high-power amplifier device having cathode means for emitting electrons, wave guiding means having effectively two mutually substantially uncoupled ends uniformly spaced from said cathode means and defining a uniform interaction space therewith, input means connected to said wave guiding means near one end thereof, means for producing a flow of electrons emitted by said cathode means along said wave guiding means in the direction from said one end to the other end thereof including means for producing within said interaction space crossed electric and magnetic fields, the improvement essentially consisting of non-reentrant uniformly iterative delay circuit means coupled to and comprising a part of said wave guiding means for effectively abstracting the in-phase amplified energy at a plurality of spaced points along said wave guiding means, said output points being separate and distinct from the input means to said wave guiding means, said delay circuit means having a plurality of uniform periodic cells each formed by two non-identical delay elements and being of the type effectively providing a wave propagation on a given wave length simultaneously in the substantially infinite-phase velocity mode and at least near the pi-mode, said cathode means and delay circuit means being substantially coextensive and rectilinear, and a plurality of output means separate and distinct from said input means distributed along said delay circuit means and coupled to said respective ones of said periodic cells for abstracting therefrom amplified energy.

12. An electron discharge amplifier, comprising substantially rectilinear cathode means adapted to emit electrons, substantially uniformly iterative delay circuit means including a serial chain of periodic uniform cells each composed of a pair of non-identical delay elements having alternately relatively long and relatively short slots, said delay circuit means being rectilinear in form and having effectively input and output ends which are separate and distinct and mutually substantially uncoupled, said cathode means and delay circuit means being substantially coextensive, uniformly spaced and defining therebetween a uniform interaction space, means for producing a flow of electrons along said delay circuit means including means for establishing crossed electric and magnetic fields in said interaction space in which said electron flow occurs, and a plurality of output means effectively coupled to respective ones of said periodic cells which comprise homologous points of said delay circuit means for abstracting in-phase amplified energy at said points during operation of said amplifier near a predetermined mode, said plurality of output means being separate and distinct from said input means and being comprised by substantially delayless wave guide structures distributed along said delay circuit means and coupled to respective ones of said periodic cells by coupling slots provided in the bottom of selected ones of said alternate long and short slots for extracting therefrom amplified energy.

References Cited by the Examiner

UNITED STATES PATENTS

| | | | |
|---|---|---|---|
| 2,566,087 | 8/1951 | Lerbs | 330—47 |
| 2,611,882 | 9/1952 | Bailey | 315—39.65 |
| 2,655,616 | 10/1953 | Rollin | 315—39.65 |
| 2,726,291 | 12/1955 | Quate | 330—43 |
| 2,768,328 | 10/1956 | Pierce | 315—3.5 |
| 2,905,940 | 9/1959 | Spencer et al. | 343—778 |
| 3,069,594 | 12/1962 | Feinstein | 315—39.65 |

ROY LAKE, *Primary Examiner.*